UNITED STATES PATENT OFFICE.

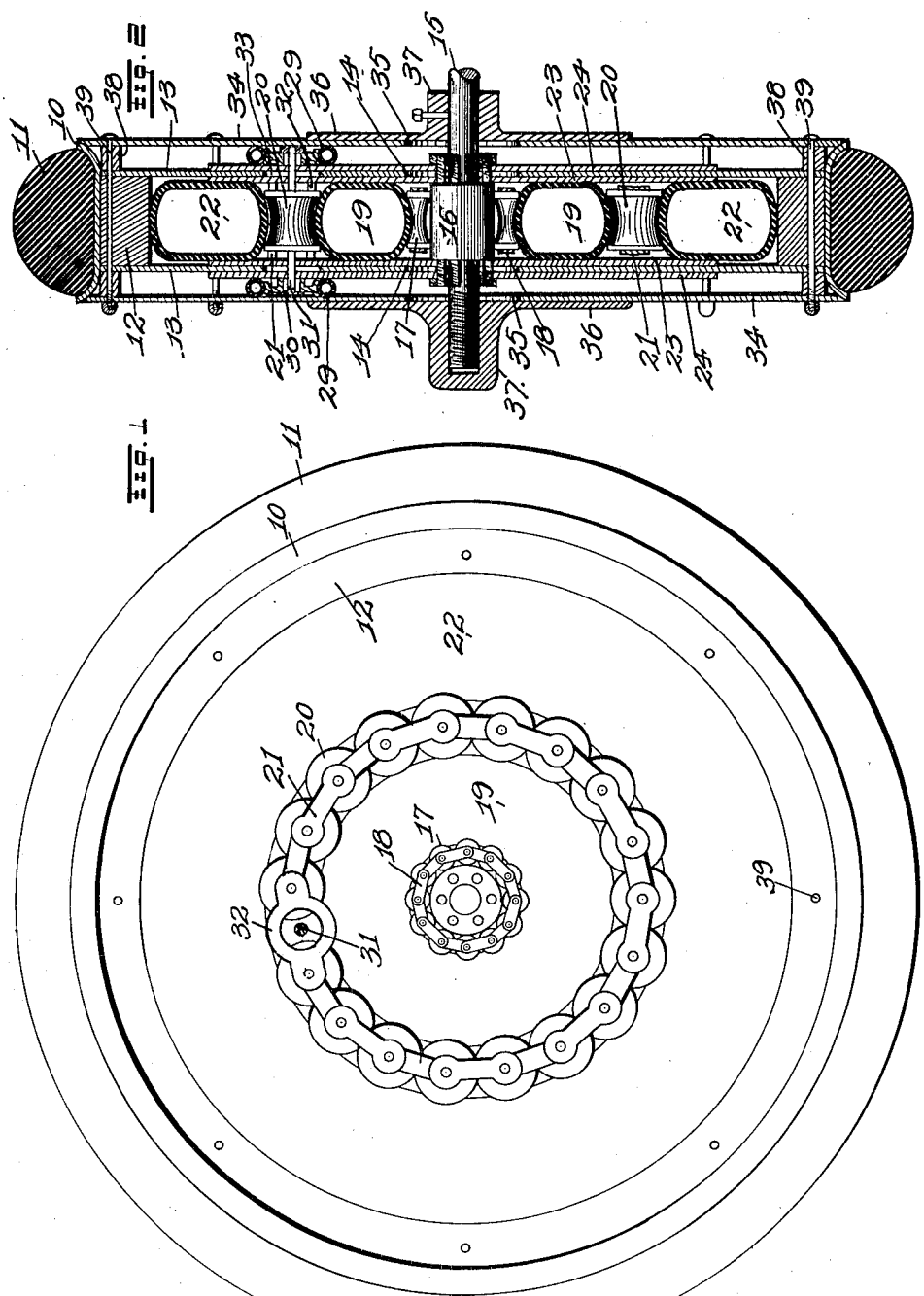

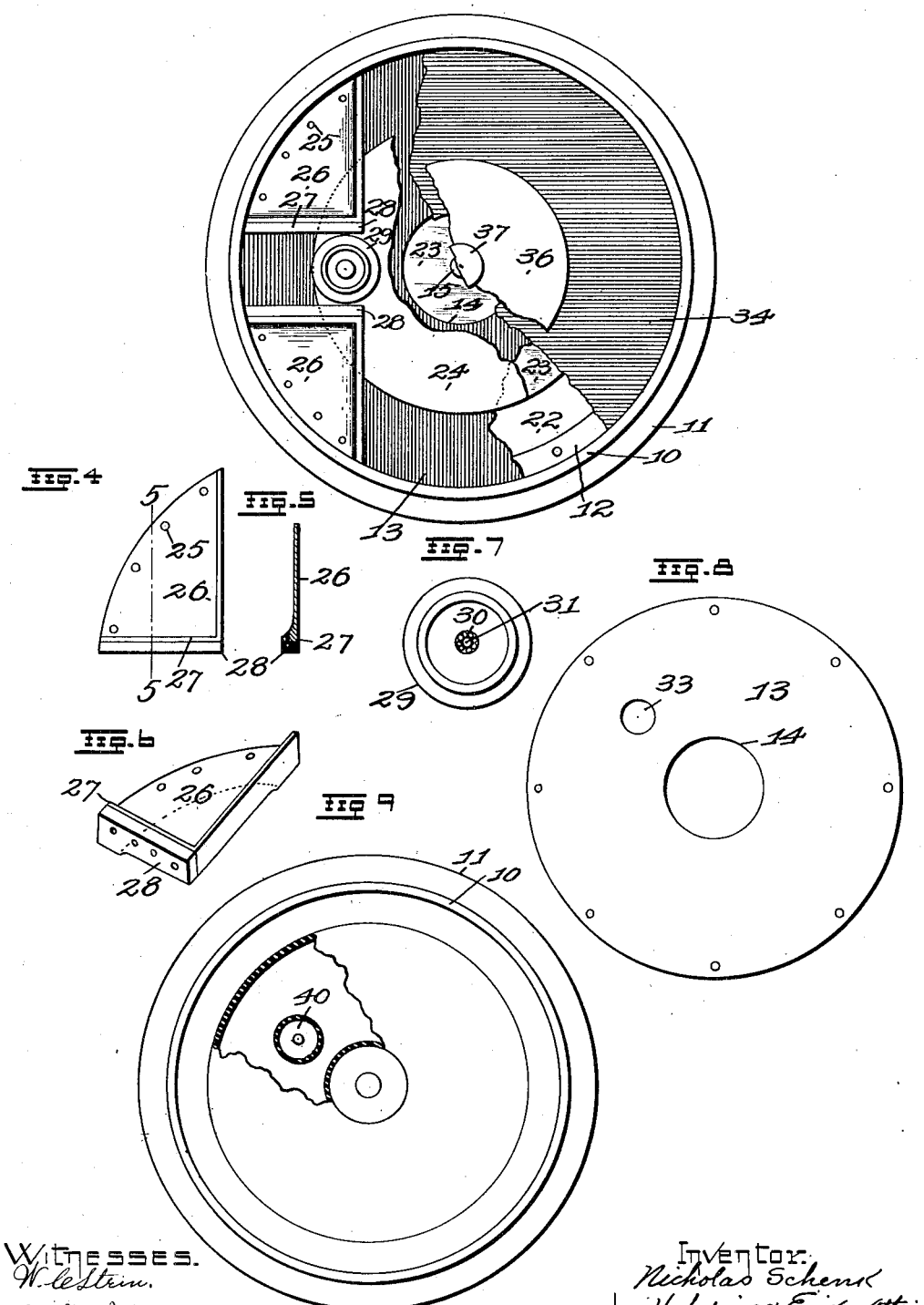

NICHOLAS SCHENK, OF ST. LOUIS, MISSOURI.

VEHICLE-WHEEL.

No. 871,297.      Specification of Letters Patent.      Patented Nov. 19, 1907.

Application filed June 29, 1906. Serial No. 324,066.

*To all whom it may concern:*

Be it known that I, NICHOLAS SCHENK, a citizen of the United States, and resident of St. Louis, Missouri, have invented certain new and useful Improvements in Vehicle-Wheels, of which the following is a specification.

This invention relates to improvements in vehicle wheels, and consists of the novel arrangement, construction and combination of parts as will be fully hereinafter described and claimed.

The object of my invention is to construct a wheel of the automobile type, wherein an inflated cushion is located between the hub and the rim to provide a certain amount of resiliency to the vehicle, and yet overcome the objectionable feature of having the tire punctured.

A further object of my invention is to provide a wheel which is absolutely puncture-proof, and yet provide the proper amount of spring or resiliency to the body of the vehicle by locating a pneumatic tube or a plurality of tubes between the rim of the wheel and its hub.

In the drawings—Figure 1 is a side view of my improved vehicle wheel, showing the internal construction. Fig. 2 is a vertical central sectional view of the same. Fig. 3 is a view of the wheel with a number of its parts broken away to show the location of the various parts. Fig. 4 is a detail view of one of the contact-plates made use of in connection with my invention. Fig. 5 is a sectional view taken on the line 5—5 of Fig. 4. Fig. 6 is a detail perspective view of the same. Fig. 7 is a detail view of the contacting wheel which is brought in contact with the contact-plates, whereby the rim of the wheel is placed in operation. Fig. 8 is a detail view of one of the plates which retains the tubes in position. Fig. 9 is a modified form of wheel showing but one pneumatic tube located between the hub and rim.

In the construction of my invention I provide a rim 10 preferably made of metal, its outer periphery being concave in form and in which is located and held in rigid position a solid rubber tire 11. The tire 11 is retained in position upon the rim 12, which I construct preferably of wood, and to the sides of the rim 12 are securely bolted plates 13, the said plates 13 being provided at their center with a large opening 14 which is for the purpose to permit the axle 15 and hub 16 to move, depending upon the amount of resiliency during the revolution of the wheel.

Around the hub 16 I provide a plurality of roller bearings 17, each being connected to the adjacent rollers by links 18, and upon the roller bearings I provide a pneumatic tube 19, and when this is properly inflated the inner periphery will adjust itself to the curved surface of each of the roller bearings 17.

Upon the outer periphery of the pneumatic tube 19 I provide a plurality of roller bearings 20, each of which is connected to the adjacent rollers by links 21 which are designed to retain each roller bearing at a fixed distance from the adjacent rollers so that one will not conflict with the other.

Upon the roller bearings 20 I provide a pneumatic tube 22, which, when inflated will occupy the space between the roller bearings 20 and the inner periphery of the rim 12.

To the sides of the hub 16 are securely bolted a pair of plates 23 and 24, the plates 23 contacting against the pneumatic tubes and sliding against the plates 13, while the plates 24 contact with the outer surface of the plates 13 and act as a telescope permitting the plates 13 to slide between the plates 23 and 24 the plates 13 being prevented from contacting with the shaft 15 by means of the opening 14.

Upon the plates 13 and securely retained in position by bolts 25 passing through the plates and rim, I provide contact-plates 26, a pair of which located on each side of the wheel, the contacting edge 27 provided with a strip of solid rubber 28. Between the strips I provide a small pneumatic wheel 29 which is mounted upon a roller bearing hub 30 and held in position upon a shaft 31, which extends through the wheel between two of the roller bearings 20. Sufficient space is allowed for the movement of the shaft 31 between the roller bearings 20 by means of the enlarged links 32, and the openings 33 formed in the plates 13. The shaft 31 is passed through openings of its same size formed in the plates 23 and 24, and by reason that these plates are bolted to the hub 16 and when motion is imparted to the axle, the plates will revolve carrying with them the axle 31 and its wheels 29. The outer periphery of the wheels 29 will come in contact with the contact-plates and cause the rim to revolve.

The sides of the wheel are covered with a highly-polished plate 34, its center portion being provided with an opening 35 corresponding to the opening 14 in the plates 13 and for the same purpose; and upon the shaft are placed disks 36 which project at a sufficient length to cover the openings 35. These disks are held upon the shaft by the collars 37. The plates 34 are designed to cover the entire internal mechanism of the wheel so as to prevent foreign substance from coming in contact with the working parts, and yet to provide a neat and finished appearance, and the said plates 34 are held apart by the washers 38 located between the plates 34 and the rim, and through the washers, rim, and plates are passed bolts 39.

By referring to Fig. 9, I show a modified form of wheel placing but one pneumatic tire between the hub and the rim, and entirely dispensing with the roller bearings, and through the tire I provide an opening 40 through which the shaft 31 may operate in order to bring the wheels 29 in contact with the contact-plates and yet not interfering with the pneumatic tire.

The main object of providing roller bearings between the pneumatic tires and the hub is to relieve the tires of any and all friction which may occur during the revolution of the wheel.

Having thus fully described my invention, what I claim is:

1. A vehicle wheel comprising a hub, a rim, inflated tubes located between the hub and the rim and roller bearings between said tubes, substantially as specified.

2. A vehicle wheel comprising a rim, a tire located upon the rim, a hub mounted loosely within the rim, inflated cushions located between the hub and the rim and roller bearings located between the tubes, and tube and hub, substantially as specified.

3. A vehicle wheel comprising a hub, a pneumatic tube located upon the hub, roller bearings located upon the pneumatic tube, a second pneumatic tube located upon the roller bearings, a rim located upon the outer pneumatic tube, and means for imparting motion to the rim when the hub is placed in revolution, substantially as specified.

4. A device of the class described comprising a wheel having a rim and hub disconnected, a pneumatic cushion located between the rim and hub, a series of plates located on each side of the tube, two of the plates connected to the rim and the remainder of the plates connected to the hub and so arranged as to permit the same to operate in telescopic form, contact-plates connected to the rim, small wheels located between the contact-plates and carried by the plates supported to the hub whereby motion is imparted to the rim by the operation of the hub and shaft, and a plurality of outer plates for incasing the entire mechanism of the wheel, substantially as specified.

In testimony whereof, I have signed my name to this specification, in presence of two subscribing witnesses.

NICHOLAS SCHENK.

Witnesses:
ALFRED A. EICKS,
WALTER C. STEIN.